(12) United States Patent
Li et al.

(10) Patent No.: US 12,094,226 B2
(45) Date of Patent: Sep. 17, 2024

(54) SIMULTANEOUS LOCALIZATION AND MAPPING METHOD, DEVICE, SYSTEM AND STORAGE MEDIUM

(71) Applicant: SHENZHEN INTELLIGENCE ALLY TECHNOLOGY CO., LTD., Shenzhen (CN)

(72) Inventors: Qingquan Li, Shenzhen (CN); Weicheng Xiong, Shenzhen (CN); Liang Zhang, Shenzhen (CN); Shuang Yang, Shenzhen (CN); Xuewan Li, Shenzhen (CN)

(73) Assignee: SHENZHEN INTELLIGENCE ALLY TECHNOLOGY CO., LTD., Shenzhen (CN)

( * ) Notice: Subject to any disclaimer, the term of this patent is extended or adjusted under 35 U.S.C. 154(b) by 366 days.

(21) Appl. No.: 17/624,317
(22) PCT Filed: Apr. 15, 2021
(86) PCT No.: PCT/CN2021/087531
§ 371 (c)(1),
(2) Date: Dec. 31, 2021
(87) PCT Pub. No.: WO2021/233029
PCT Pub. Date: Nov. 25, 2021

(65) Prior Publication Data
US 2023/0260151 A1    Aug. 17, 2023

(30) Foreign Application Priority Data
May 18, 2020   (CN) .......................... 202010416829.5

(51) Int. Cl.
G06V 20/64    (2022.01)
G06T 7/13     (2017.01)
(Continued)

(52) U.S. Cl.
CPC ................ *G06V 20/64* (2022.01); *G06T 7/13* (2017.01); *G06T 7/248* (2017.01); *G06T 7/74* (2017.01);
(Continued)

(58) Field of Classification Search
CPC .. G06T 20/64; G06T 7/74; G06T 7/13; G06V 20/64
See application file for complete search history.

(56) References Cited

U.S. PATENT DOCUMENTS
9,519,979 B1   12/2016   Hilde

FOREIGN PATENT DOCUMENTS
CN   104700402 A   6/2015
CN   105469405 A   4/2016
(Continued)

OTHER PUBLICATIONS

Jiang el al., A Simultaneous Localization and Mapping (SLAM) Framework for 2.5D Map Building Based on Low-Cost LiDar and Vision Fusion, Appl. Sci., (2019), 9:1-17.
(Continued)

*Primary Examiner* — Sam Bhattacharya
(74) *Attorney, Agent, or Firm* — Nevrivy Patent Law Group P.L.L.C.

(57) ABSTRACT

Disclosed are a method for simultaneous localization and mapping, device, system and storage medium. The method comprises: acquiring a local binocular vision image and a local three-dimensional laser point cloud image that can be collected at present; preprocessing the local binocular vision image and the local three-dimensional laser point cloud image, respectively; acquiring a position and an attitude of a local binocular vision map according to the preprocessed local binocular vision image; fusing the position and attitude of the local binocular vision map with the preprocessed local three-dimensional laser point cloud image to obtain a local fusion map; and performing a global consistency optimization on a global map according to the local fusion map to obtain a dense point cloud map and output a current position information and a current attitude information in real time so
(Continued)

as to complete the simultaneous localization and mapping (SLAM), wherein the global map is constructed according to a global three-dimensional laser point cloud image.

11 Claims, 3 Drawing Sheets

(51) Int. Cl.
  *G06T 7/246* (2017.01)
  *G06T 7/73* (2017.01)
  *G06V 10/44* (2022.01)
  *G06V 10/46* (2022.01)
  *G06V 10/75* (2022.01)
  *G06V 20/10* (2022.01)

(52) U.S. Cl.
  CPC .......... *G06V 10/457* (2022.01); *G06V 10/462* (2022.01); *G06V 10/757* (2022.01); *G06V 20/10* (2022.01); *G06T 2207/10028* (2013.01); *G06T 2207/20221* (2013.01)

(56) References Cited

FOREIGN PATENT DOCUMENTS

| CN | 107796397 A | 3/2018 |
|---|---|---|
| CN | 110132278 A | 8/2019 |
| CN | 110261870 A | 9/2019 |
| CN | 110322500 A | 10/2019 |
| CN | 110361027 A | 10/2019 |
| CN | 110389348 A | 10/2019 |
| CN | 110568447 A | 12/2019 |
| CN | 110853075 A | 2/2020 |
| CN | 110910498 A | 3/2020 |
| CN | 111045017 A | 4/2020 |
| CN | 111105495 A | 5/2020 |

OTHER PUBLICATIONS

Zhang et al., Visual-lidar Odometry and Mapping: Low-drift, Robust, and Fast, IEEE International Conference on Robotics and Automation, (2015), p. 2174-2181.

Houben et al., Joint 3D Laser and Visual Fiducial Marker Based SLAM for a Micro Aerial Vehicle, IEEE International Conference on Multisensor Fusion, (2016), p. 609-614.

Yang et al., Multi-camera visual SLAM for autonomous navigation of micro aerial vehicles, Robotics and Autonomous Systems, (2017), 93:116-134.

Zhang et al., A Visual SLAM System with Laser Assisted Optimization, IEEE/ASME, (2019), p. 187-192.

Xu et al., SLAM of Robot based on the Fusion of Vision and LIDAR, IEEE International Conference on Cyborg and Bionic Systems, (2018), p. 121-126.

Jin et al., A Multisensor Data Fusion Approach for Simultaneous Localization and Mapping, IEEE Intelligent Transportation Systems Conference (ITSC), (2019), p. 1317-1322.

International Search Report from Appl. No. PCT/CN2021/087531, mailed on Aug. 31, 2021.

SIMULTANEOUS LOCALIZATION AND MAPPING METHOD, DEVICE, SYSTEM AND STORAGE MEDIUM

CROSS-REFERENCE TO RELATED APPLICATIONS

The present disclosure claims all the benefits of the Chinese patent application No. 202010416829.5, filed on May 18, 2020 before the China National Intellectual Property Administration of the People's Republic of China, entitled "Simultaneous Localization and Mapping Method, Device, System and Storage Medium", which is explicitly incorporated herein by reference in its entirety.

FIELD

The present disclosure relates to the technical field of robot and in particular relates to a simultaneous localization and mapping method, device, system and storage medium.

BACKGROUND

As an interdisciplinary subject, intelligent robot integrates motion dynamics, system structure, sensing technology, control technology and other disciplines and technologies. Among these technologies, provision of environment perception and localization for mobile robots is an essential process. Through environment perception and localization, current external environment information of a mobile robot and its own position and attitude information in the environment can be fed back to further make a corresponding decision and control the motor to move forward. As an essential underlying technology of mobile intelligent robots (MIR), simultaneous localization and mapping (SLAM) not only needs to provide simultaneous localization information for robots, but needs to simultaneously build a dense map of the environment for plan module to make corresponding decisions and achieve obstacle avoidance and other functions. Especially in some specific applications, such as robots in logistics and transportation, power inspection robots, man riding autonomous vehicles in parks, and the like, high-precision localization information e.g. at centimeter level or even millimeter level is crucial. Only with high-precision localization information can functions such as autonomous charging, fixed-point inspection, and fixed-point parking be achieved.

For example, at present, mobile intelligent robots (MIR) need to have a most basic function, i.e., autonomous charging. In general practice, due to the limitation of battery technology and the demand for 24-hour continuous inspection, it is difficult for mobile intelligent robots (MIR) to work continuously for more than 12 hours. That is, it cannot work continuously, or the battery power will be exhausted sooner or later. In the application requirements, mobile robots need to work continuously to keep the function uninterrupted, so the autonomous charging function for mobile intelligent robots (MIR) is essential. However, in the actual situation, the charging room is a closed small room, in which the allowable error of charging slot is small, and of which the characteristics comprise less external environment features and high localization accuracy requirements. Therefore, the demand for high-precision simultaneous localization is very urgent.

Simultaneous localization and mapping (SLAM) needs to estimate its own position and attitude in the environment and simultaneously construct the map information of the external environment. At present, the mainstream methods are single-line laser radar based SLAM, three-dimensional laser radar based SLAM, vision inertia based SLAM, pure vision based SLAM and so on.

Single-line laser radar based SLAM performs Kalman filter estimation depending on the distance information between the sensor and the external environment obtained by the single-line laser radar to give the state variable information such as position and attitude and simultaneously construct the planar grid map of the environment. Since this method can only estimate planar information and navigation angle, it is only suitable for indoor non-fluctuating closed environment. Three-dimensional laser radar based SLAM constructs nonlinear model depending on multiple-line laser radar and through the relationships between each frame of the laser radar and between each frame and the map to estimate the state and obtain the attitude of 6DOF and the dense environmental map. Since the data obtained by the three-dimensional laser radar are discrete three-dimensional points and it is difficult to conduct loop closure detection with discrete points, the error is greatly increased. Moreover, in less structured environment such as charging room, laser radar based SLAM when estimating the state is easy to degrade and even fail. Both vision inertia based SLAM and pure vision based SLAM are technical solutions using camera as a basic sensor. Vision based solutions can conduct loop closure detection easily with texture information and are suitable for less structured scenes. However, it is difficult for vision based SLAM system to obtain a dense map with high-precision, while the dense map is essential for the planning and decision-making of mobile intelligent robots (MIR).

Therefore, it needs to provide a technical solution on how to conduct a high-precision estimation of state variables such as position and attitude and simultaneously obtain the dense three-dimensional map information of the environment.

SUMMARY

In one aspect, the present disclosure relates to a method for simultaneous localization and mapping (SLAM), comprising:
  acquiring a local binocular vision image and a local three-dimensional laser point cloud image that can be collected at present;
  preprocessing the local binocular vision image and the local three-dimensional laser point cloud image, respectively;
  acquiring a position and an attitude of a local binocular vision map according to the preprocessed local binocular vision image;
  fusing the position and the attitude of the local binocular vision map with the preprocessed local three-dimensional laser point cloud image to obtain a local fusion map; and
  performing a global consistency optimization on a global map according to the local fusion map to obtain a dense point cloud map and output a current position information and a current attitude information in real time so as to complete the simultaneous localization and mapping (SLAM), wherein the global map is constructed according to a global three-dimensional laser point cloud image.

In some embodiments, the preprocessing the local binocular vision image comprises:
- extracting features of the local binocular vision image to obtain feature points of the local binocular vision image;
- selecting a specific feature point meeting a preset condition from the feature points of the local binocular vision image;
- calculating a feature descriptor of the specific feature point; and
- performing a feature matching for the binocular visual image according to the feature descriptor, so as to construct a local map according to the local binocular visual image obtained after the feature matching.

In some embodiments, the preprocessing the local three-dimensional laser point cloud image comprises:
- extracting ground points and non-ground points from the three-dimensional laser point cloud image;
- distinguishing corner points and planar points in the ground points, and distinguishing corner points and planar points in the non-ground points according to a preset method; and
- combining the corner points in the ground points and the corner points in the non-ground points together to form a corner point set, and combining the planar points in the ground points and the planar points in the non-ground points together to form a planar point set.

In some embodiments, the acquiring a position and an attitude of a local binocular vision map according to the preprocessed local binocular vision image comprises:
- performing local map tracking according to the preprocessed local binocular vision image; and
- optimizing a currently obtained local map during map tracking to obtain the position and the attitude of the local binocular vision map.

In some embodiments, the performing local map tracking according to the preprocessed local binocular vision image comprises:
- inserting a first frame image of the preprocessed local binocular vision image into a local map as a key frame;
- matching the feature points between the first frame image as a reference frame and a newly added current frame image;
- calculating a position difference and/or a rotation angle difference between the first frame image and the current frame image according to matched feature points between the first frame image and the current frame image;
- inserting the current frame image into the local map where the current frame image is determined as a key frame according to the position difference and/or the rotation angle difference; and
- repeating above operations for a next newly added frame image until all frame images in the local binocular vision image are processed to complete the local map tracking.

In some embodiments, the determining the current frame image as a key frame according to the position difference and/or the rotation angle difference specifically comprises:
- determining the current frame image as a key frame where the position difference between the first frame image and the current frame image is calculated, and the position difference is greater than or equal to a first preset threshold;
- or determining the current frame image as a key frame where the rotation angle difference between the first frame image and the current frame image is calculated, and the rotation angle difference is greater than or equal to a second preset threshold;
- or determining the current frame image as a key frame where the position difference and the rotation angle difference between the first frame image and the current frame image are calculated, and both the position difference and the rotation angle difference are greater than or equal to the corresponding preset thresholds.

In some embodiments, the optimizing the currently obtained local map during map tracking to obtain the position and the attitude of the local binocular vision map comprises:
- selecting other key frames satisfying a common view relationship with a new key frame from the currently obtained local map after the new key frame is determined to be inserted into the local map;
- performing a least squares estimation for residuals between all key frames satisfying the common view relationship with local bundle adjustment; and
- acquiring the position and the attitude of the local binocular vision map where the residuals are determined to fall into a preset space range.

In some embodiments, the fusing the position and the attitude of the local binocular vision map with the preprocessed local three-dimensional laser point cloud image to obtain a local fusion map comprises:
- determining a position and an attitude corresponding to each frame of the preprocessed local three-dimensional laser point cloud image with a time interpolation method according to the position and the attitude of the local binocular vision map and the preprocessed local three-dimensional laser point cloud image;
- extracting a point cloud image with a preset frame number from the preprocessed local three-dimensional laser point cloud image to construct a local point cloud map;
- determining a first frame point cloud image in the local point cloud map as a key frame point cloud image;
- performing an optimization on position and attitude for a newly added point cloud image;
- determining a position difference and/or an attitude difference between a point cloud image with optimized position and attitude and the key frame point cloud image;
- adding the point cloud image with an optimized position and attitude to the local point cloud map after the point cloud image with an optimized position and attitude is determined as a key frame according to the position difference and/or the attitude difference between the point cloud image with an optimized position and attitude and the key frame point cloud image; and
- constructing a local fusion map after all key frames are obtained from all point cloud images where the point cloud image with an optimized position and attitude is determined as a current key frame.

In some embodiments, the performing an optimization on position and attitude for a newly added point cloud image comprises:
- searching for n adjacent corner points corresponding to each corner point in one newly added frame point cloud image, respectively, from a corner point set corresponding to the local point cloud map, and searching for j adjacent planar points corresponding to each planar point in one newly added frame point cloud image, respectively, from a planar point set corresponding to the local point cloud map;

calculating eigenvalues of the n adjacent corner points corresponding to a first corner point, and eigenvalues of the j adjacent planar points corresponding to a first flat point, respectively;

extracting a first preset number of points in a linear line defined by the n adjacent corner points where the adjacent points corresponding to the first corner point are determined to appear linear features according to the eigenvalues corresponding to the n adjacent corner points, respectively;

extracting a second preset number of points in a spatial plane defined by the j adjacent planar points where the adjacent points corresponding to the first planar point are determined to appear planar features according to the eigenvalues corresponding to the j adjacent flat points, respectively;

constructing a cost function according to a corresponding relationship between the first preset number of points and a line of the first preset number of points, a corresponding relationship between the second preset number of points and a spatial plane of the second preset number of points, and a position and an attitude of the one newly added frame point cloud image; and performing an optimization on position and attitude for the one newly added frame point cloud image with the cost function, wherein the first corner point is any corner point in the one newly added frame point cloud image, the first planar point is any planar point in the one newly added frame point cloud image, and both n and j are positive integers.

In some embodiments, the performing a global consistency optimization on a global map according to the local fusion map to obtain a dense point cloud map and output a current position information and a current attitude information in real time so as to complete the simultaneous localization and mapping (SLAM) comprises:

acquiring an adjacent frame image corresponding to a first frame of fusion image in the local fusion map with a laser loop closure detection;

acquiring a relative position and attitude between the first frame fusion image and the adjacent frame image; and performing a global consistency optimization on a global map according to each frame fusion image in the local fusion map, an adjacent frame image corresponding to each frame fusion image, and a relative position between the each frame fusion image and the adjacent frame image, to obtain a dense point cloud map and output a current position information and a current attitude information in real time so as to complete the simultaneous localization and mapping (SLAM), wherein the first frame fusion image is any frame fusion image in the local fusion map.

In another aspect, the present disclosure relates to a simultaneous localization and mapping (SLAM) device, comprising:

an acquisition unit adapted to acquire a local binocular vision image and a local three-dimensional laser point cloud image that can be collected at present, and acquire a position and an attitude of a local binocular vision map according to the preprocessed local binocular vision image;

a processing unit adapted to preprocess the local binocular vision image and the local three-dimensional laser point cloud image, respectively;

a fusion unit adapted to fuse the position and the attitude of the local binocular vision map with the preprocessed local three-dimensional laser point cloud image to obtain a local fusion map; and a map optimization unit adapted to perform a global consistency optimization on a global map according to the local fusion map to obtain a dense point cloud map and output a current position information and a current attitude information in real time so as to complete the simultaneous localization and mapping (SLAM), wherein the global map is constructed according to the global three-dimensional laser point cloud image.

In still another aspect, the present disclosure relates to a system for simultaneous localization and mapping (SLAM), comprising:

at least one processor and a memory;

wherein the processor is adapted to carry out a simultaneous localization and mapping (SLAM) program stored in the memory to carry out the method for simultaneous localization and mapping (SLAM) of the present disclosure.

In still yet another aspect, the present disclosure relates to a computer storage medium, wherein one or more programs are stored on the computer storage medium, the one or more programs can be carried out to perform the method for simultaneous localization and mapping (SLAM) of the present disclosure.

A method for simultaneous localization and mapping (SLAM) of the present disclosure comprises acquiring a local binocular vision image and a local three-dimensional laser point cloud image that can be collected at present, and preprocessing the local binocular vision image and the local three-dimensional laser point cloud image, respectively. The preprocessed local binocular vision image is fused with the preprocessed local three-dimensional laser point cloud image to obtain a local fusion map. The acquisition of the local fusion map is actually a process of optimizing the preprocessed local three-dimensional laser point cloud image with the preprocessed local binocular vision image, that is optimizing the local map. After acquiring the locally optimized fusion map, the global consistency is optimized on the global map according to the local fusion map to obtain the dense point cloud map. The fusion of binocular vision image and three-dimensional laser point cloud image can overcome the issues that three-dimensional laser fails easily in the scene with few feature structures, realize high-precision estimation of position, attitude and other state variables, and output dense three-dimensional point cloud image with global consistency. Moreover, according to the dense three-dimensional point cloud image, the current position information per se can be determined in real time to complete the simultaneous localization and mapping (SLAM).

DETAILED DESCRIPTION

In order to make the objects, technical solutions and advantages of the examples in the present disclosure clearer, some examples of the technical solutions in the present disclosure will be described clearly and completely with reference to the drawings in the present disclosure. It is obvious that the examples as described are only some of the examples of the present disclosure, rather than all the examples. Based on the examples in the present disclosure, all other examples obtained by one skilled in the art without involving inventive efforts fall within the protection scope of the present disclosure.

In order to facilitate the understanding of the examples in the present disclosure, the specific examples will be further explained in combination with the drawings. The examples do not constitute the limitation on the examples of the present disclosure.

Figure 1:
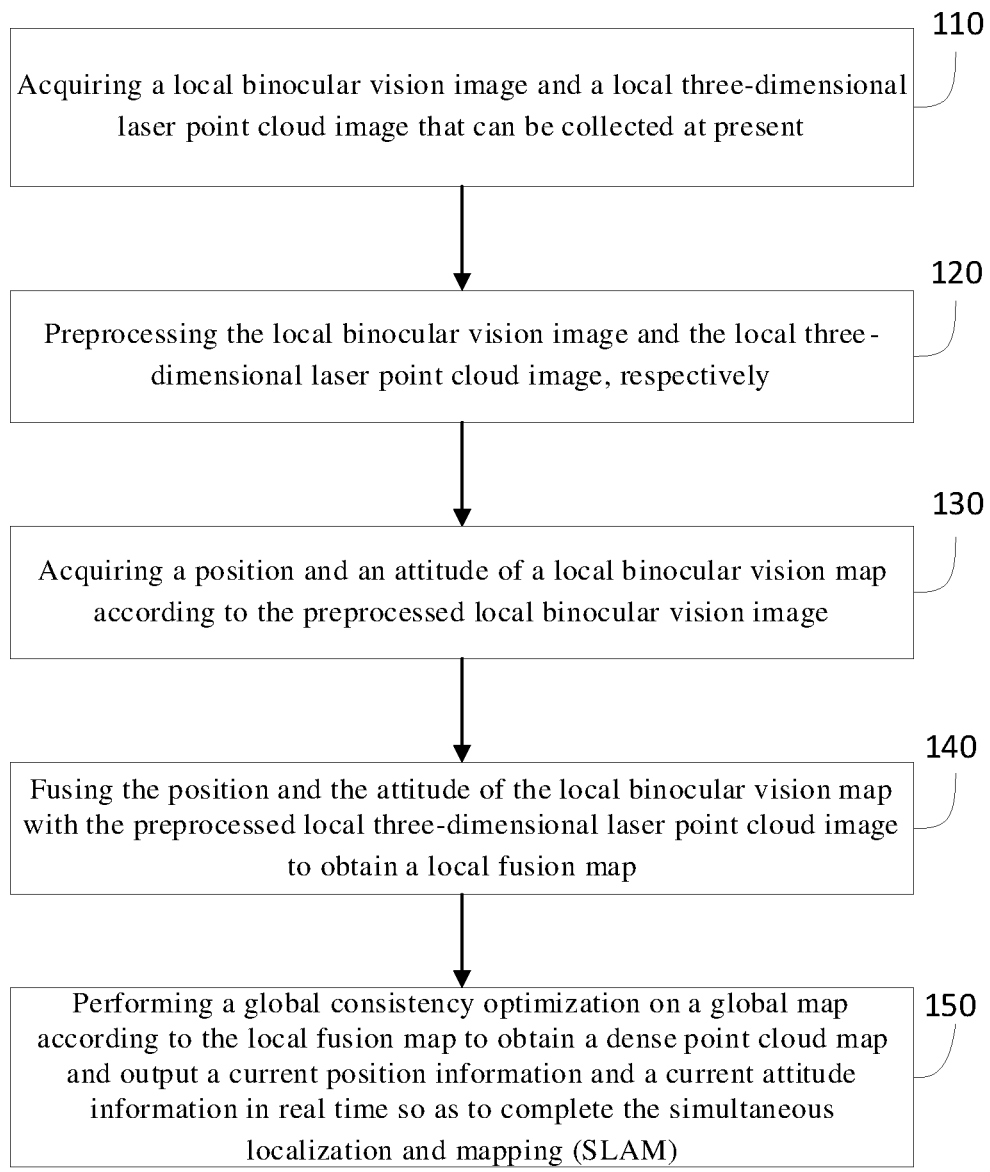
FIG. 1 shows a schematic flow diagram illustrating a method for simultaneous localization and mapping (SLAM) provided in one example of the present disclosure.

FIG. 1 shows a schematic flow diagram illustrating a method for simultaneous localization and mapping (SLAM) provided in one example of the present disclosure. As shown in FIG. 1, the present example describes an application scenario of simultaneous localization and mapping (SLAM) of a robot in an unfamiliar environment to illustrate the method, comprising:

S110, acquiring a local binocular vision image and a local three-dimensional laser point cloud image that can be collected at present;

S120, preprocessing the local binocular vision image and the local three-dimensional laser point cloud image, respectively;

S130, acquiring a position and an attitude of a local binocular vision map according to the preprocessed local binocular vision image;

S140, fusing the position and the attitude of the local binocular vision map with the preprocessed local three-dimensional laser point cloud image to obtain a local fusion map; and S150, performing a global consistency optimization on a global map according to the local fusion map to obtain a dense point cloud map and output a current position information and a current attitude information in real time so as to complete the simultaneous localization and mapping (SLAM), wherein the global map is constructed according to a global three-dimensional laser point cloud image.

In some embodiments, the robot uses an image acquisition device to collect images of the current environment and obtain a binocular vision image. At the same time, the robot uses a three-dimensional laser radar to scan the surrounding environment of the current position to obtain a three-dimensional laser point cloud image.

In some embodiments, preprocessing the local binocular vision image may comprise:

extracting features of the local binocular vision image to obtain feature points of the local binocular vision image;

selecting a specific feature point meeting a preset condition from the feature points of the local binocular vision image;

calculating a feature descriptor of the specific feature point; and performing a feature matching for the binocular visual image according to the feature descriptor, so as to construct a local map according to the local binocular visual image obtained after the feature matching.

In some embodiments, when extracting features of the local binocular vision image, a rough extraction of features may be carried out. For example, a large number of feature points are determined by simply determining variation of the gray value around image pixels. For example, a gray image feature extraction method is used to extract image features.

According to the above method, the number of extracted image feature points will be relatively large. Therefore, it is still necessary to screen the feature points to obtain specific feature points that meet a preset condition.

In some embodiments, a decision tree may be generated according to a preset number of pixels around the feature points, the feature points that meet a requirement of the decision tree may be identified, a non-maximum suppression method is used to remove the locally denser feature points, and the remaining feature points are considered as specific feature points.

Moreover, in order to take into account the characteristic scale deformation and rotation invariance, the feature points may be calculated by building pyramid and using matrix to obtain the scale information and rotation information of the features, which are considered as the feature descriptors of the specific feature points. It is well-known that the feature descriptors are used for subsequent image matching. That is, a feature matching is performed for the binocular visual image according to the feature descriptor, so as to construct a local map according to the local binocular visual image obtained after the feature matching.

In some embodiments, preprocessing the local three-dimensional laser point cloud image may comprise:

extracting ground points and non-ground points from the three-dimensional laser point cloud image;

distinguishing corner points and planar points in the ground points, and distinguishing corner points and planar points in the non-ground points according to a preset method; and combining the corner points in the ground points and the corner points in the non-ground points together to form a corner point set, and combining the planar points in the ground points and the planar points in the non-ground points together to form a planar point set.

In some embodiments, the data obtained by a three-dimensional laser radar are three-dimensional point cloud. Firstly, the laser radar is projected according to the scanning direction, and ground points and non-ground points in the laser radar are extracted by calculating the adjacent depth. A curvature value on the scanning line is calculated, in which points with large curvature are considered as corner points, and points with small curvature are considered as planar points. Finally, the corner points and the planar points of the ground points and non-ground points are combined to obtain two final sets of feature points, which are a corner point set and a planar point set, respectively.

In some embodiments, acquiring a position and an attitude of a local binocular vision map according to the preprocessed local binocular vision image may comprise:

performing local map tracking according to the preprocessed local binocular vision image; and optimizing a currently obtained local map during map tracking to obtain the position and the attitude of the local binocular vision map. In some embodiments, performing local map tracking according to the preprocessed local binocular vision image may comprise:

inserting a first frame image of the preprocessed local binocular vision image into a local map as a key frame;

matching the feature points between the first frame of image as a reference frame and a newly added current frame image;

calculating a position difference and/or a rotation angle difference between the first frame image and the current frame image according to matched feature points between the first frame image and the current frame image;

inserting the current frame image into the local map where the current frame image is determined as a key frame according to the position difference and/or the rotation angle difference; and repeating above operations for a next newly added frame image until all frame images in the local binocular vision image are processed to complete the local map tracking.

In some embodiments, in the beginning, a first frame image of a processed local binocular vision image is inserted into a local map as a key frame, that is an initial frame of the local map. Starting with this frame image, frame images that meet the requirement are screened from the processed local binocular vision image and added to the local map. In some embodiments, if a local map is composed of key frames, it is necessary to determine whether the subsequent newly added frame images can be used as key frames.

The specific process comprises matching feature points with a newly added current frame image by taking the first frame image as a reference frame.

The specific process of matching feature points has been described above and will not be repeated here.

According to the matched feature points between the first frame image and the current frame image, a PnP (Perspective-n-Point) algorithm is used to estimate the position and the attitude of the current frame image and the position and the attitude of the key frame (which is the first frame image at the current stage). Finally, a position difference and/or a rotation angle difference between the first frame image and the current frame image are determined based on the position and the attitude of the current frame image and the position and the attitude of the first frame of image.

The current frame image is inserted into the local map where the current frame image is determined as a key frame according to the position difference and/or the rotation angle difference.

In some embodiments, when determining a current frame image as a key frame according to a position difference and/or a rotation angle difference, the determination method may be adopted, which comprises:

determining the current frame image as a key frame where the position difference between the first frame image and the current frame image is calculated, and the position difference is greater than or equal to a first preset threshold;

or determining the current frame image as a key frame where the rotation angle difference between the first frame image and the current frame image is calculated, and the rotation angle difference is greater than or equal to a second preset threshold;

or determining the current frame image as a key frame where the position difference and the rotation angle difference between the first frame image and the current frame image are calculated, and the position difference and both the rotation angle difference are greater than or equal to the corresponding preset thresholds.

The above is only an exemplary method for determining whether the next frame image is a key frame based on the first frame image. In the next operation, the current key frame can be taken as the reference frame, and the above method can be used to further determine whether the next newly added frame image is a key frame. Where it is a key frame, it is added to the local map to construct the local map and complete the local map tracking.

In some embodiments, when estimating the position and the attitude of the current frame image and the position and the attitude of the key frame (which is the first frame image at the current stage) according to a PnP algorithm, it is also necessary to initialize all the left and right ocular feature matching points in the two frame images (that is, the current frame image and the first frame image) with feature matching points to optimize the position and the attitude of each frame image.

Figure 2:
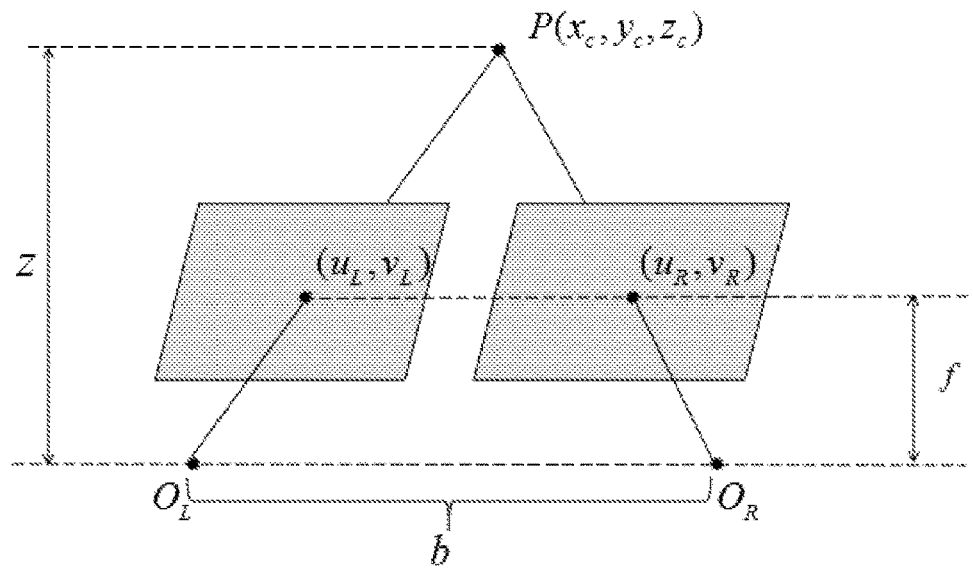
FIG. 2 shows a principle of binocular parallax provided in the present disclosure.

In some embodiments, depth estimation on the initial frame may be carried out by binocular vision initialization with binocular disparity map. The stereo calibration of binocular vision is carried out. The stereo calibration may be carried out in the previous calibration work, and then the binocular disparity principle diagram as shown in FIG. 2 can be obtained. Taking a spatial coordinate point as an example, the initialization process of the left and right ocular feature matching points corresponding to the spatial coordinate points in the corresponding two frame images with the feature matching points is explained. Please refer to FIG. 2 for details. In FIG. 2, $O_L$ and $O_R$ are the left and right ocular optical centers, respectively. For example, when the image acquisition devices are all cameras, they are the left and right ocular optical centers of the cameras. $(u_L, v_L)$ and $(u_R, v_R)$ are the left and right ocular feature matching points. The spatial coordinate corresponding to the two pixel matching points is set as $P(x_c, y_c, z_c)$. Based on the principle of binocular image, the spatial coordinate $P(x_c, y_c, z_c)$ can be obtained. For example, the depth value $z_c$ of a spatial point can be expressed as the following formula:

$$z_c = \frac{f_b}{u_L - u_R} \qquad \text{(Formula 1)}$$

wherein b is a binocular baseline, f is a focal length, and $u_L$ and $u_R$ are abscissa values of the left and right ocular feature matching points, respectively.

Supposing that $(u_i, v_i)$ are the abscissa and ordinate corresponding to any frame image, respectively; and $P(x_i, y_i, z_i)$ is the coordinate of the spatial point corresponding to the frame image. Let K be the internal parameter of the camera, $z_i$ is the pixel depth value, the position and the attitude of the camera is T=[R, t], and the corresponding Lie algebra is $\xi$, then there is Formula 2. Please refer the following for details:

$$s_i \begin{bmatrix} u_i \\ v_i \\ 1 \end{bmatrix} = K \exp(\xi^\wedge) \begin{bmatrix} x_i \\ y_i \\ z_i \\ 1 \end{bmatrix} \qquad \text{(Formula 2)}$$

The state represented by Formula 2 is an ideal state, which means that the position and the attitude calculated according to the image feature points collected by the camera (expression on the left side of the formula) is the same as the position and the attitude calculated according to the actual spatial coordinates (expression on the right side of the formula). That is, the expression on the left side of the formula and the expression on the right side of the formula should be equal.

In an ideal state, there should be an occasion that $(u_L, v_L)$ are the abscissa and ordinate corresponding to the first frame image, respectively $(u_R, v_R)$ are the abscissa and ordinate corresponding to the newly added frame image, respectively. $P(x_c, y_c, z_c)$ is the coordinate of the space point. Let K be the internal parameter of the camera, $z_c$ is the pixel depth value, the position and the attitude of the camera is T=[R, t], and the corresponding Lie algebra is ξ. After applying Formula 2 correspondingly, please refer to Formula 3 and Formula 4:

$$s_L \begin{bmatrix} u_L \\ v_L \\ 1 \end{bmatrix} = K \exp(\xi^\wedge) \begin{bmatrix} x_c \\ y_c \\ z_c \\ 1 \end{bmatrix} \quad \text{(Formula 3)}$$

$$s_R \begin{bmatrix} u_R \\ v_R \\ 1 \end{bmatrix} = K \exp(\xi^\wedge) \begin{bmatrix} x_c \\ y_c \\ z_c \\ 1 \end{bmatrix} \quad \text{(Formula 4)}$$

However, during practical application, there should be some errors when calculating the position with the data collected by the image acquisition device. Therefore, the left and right sides of the formula must not be equal. In order to make the position and the attitude obtained by the pixel as close to the actual position as possible, it can be obtained by the least square algorithm, so that the error between the position and the attitude obtained by the pixel coordinates and the position and the attitude obtained by the actual spatial coordinates is minimum.

In some embodiments, assuming there are n pairs of matching points, a cost function of the position and the attitude of the camera is constructed based on n pairs of matching points. The cost function is solved by least square algorithm.

Please refer the following formula for details:

$$f_{\xi c} = \arg\min_\xi \frac{1}{2} \sum_{i=1}^n \left\| u_i - \frac{1}{s_i} K \exp(\xi^\wedge) P_i \right\|^2 \quad \text{(Formula 5)}$$

wherein, $u_i$ is one of the feature point coordinates of the $i^{th}$ pair of the feature points in the n pairs of left and right ocular feature points, $P_i$ is an actual space coordinate corresponding to the coordinate of the $i^{th}$ pair of feature points, K is the camera parameter, and ξ is the Lie algebra. $f_{\xi c}$ can be set according to the actual situation and ξ is calculated with this formula. The other pairs of the feature points only need to meet the requirement of this formula.

All the left and right ocular feature matching points in the two frame images with feature matching points (i.e., the current frame image and the first frame image) can be initialized with this formula. Therefore, the position and the attitude of each frame image can be optimized so that the position difference and/or rotation angle difference between two frame images with the same feature points can be calculated more accurately.

Therefore, it can be realized that the local map is composed of key frames, that is, carrying out the local map tracking. However, due to the issues of increasing error in local map tracking, especially when the tracking time is relatively long, the error will accumulate from the previous frame and transfer to the current frame until the error becomes larger and larger, which results in tracking failure.

Therefore, in some embodiments, during local map tracking, optimizing the currently obtained local map is also comprised to obtain the position and the attitude of the local binocular vision map.

In some embodiments, optimizing the currently obtained local map to obtain the position and the attitude of the local binocular vision map may comprise:

selecting other key frames satisfying a common view relationship with a new key frame from the currently obtained local map after a new key frame is determined to be inserted into the local map;

performing a least squares estimation for residuals between all key frames satisfying the common view relationship with local bundle adjustment; and acquiring the position and the attitude of the local binocular vision map where the residuals are determined to fall into a preset space range.

In some embodiments, when a new key frame is inserted into a local map, other key frames that satisfy a common view relationship with such key frame in the local map are selected to form a local optimization map. The common view relationship is determined by the number of feature matching points between the two frames, that is, the number of feature matching points between the two frames is greater than a preset number threshold. After the formation of the local optimization map, a least squares estimation for residuals between all key frames satisfying the common view relationship can be performed with local bundle adjustment, and the error is constrained within a certain spatial range. That is the position and the attitude of the local binocular vision map is acquired where the residuals are determined to fall into a preset space range.

Local bundle adjustment may build a nonlinear model to minimize the re-projection error according to the PnP algorithm, and the corresponding cost function is the same as or similar to Formula 5, which will not be repeated here. Therefore, local visual tracking and local map construction are carried out, and the position and the attitude of the local binocular vision map is obtained.

In some embodiments, the position and the attitude of the local binocular vision map obtained by visual tracking and local map construction may be used as an initial value matching the laser radar for further optimization. Generally, the output frequency of a camera is 30 Hz, while the output frequency of a three-dimensional laser radar is 10 Hz. Therefore, the position and the attitude of the three-dimensional laser radar may be obtained by time interpolation.

In some embodiments, fusing the position and the attitude of the local binocular vision map with the preprocessed local three-dimensional laser point cloud image to obtain a local fusion map may comprise: determining a position and an attitude corresponding to each frame point cloud image in the preprocessed local three-dimensional laser point cloud image with a time interpolation method according to the position and the attitude of the local binocular vision map and the preprocessed local three-dimensional laser point cloud image;

extracting a point cloud image with a preset frame number from the preprocessed local three-dimensional laser point cloud image to construct a local point cloud map;

determining a first frame point cloud image in the local point cloud map as a key frame point cloud image;

performing an optimization on position and attitude for a newly added point cloud image;

determining a position difference and/or an attitude difference between a point cloud image with an optimized position and attitude and the key frame point cloud image;

adding the point cloud image with an optimized position and attitude to the local point cloud map after the point cloud image with an optimized position and attitude is determined as a key frame according to the position difference and/or the attitude difference between the point cloud image with an optimized position and attitude and the key frame point cloud image; and repeating above operations for a next newly added frame image by taking the point cloud image with an optimized position and attitude as a current key frame until all point cloud images are processed with the above operations, that is constructing a local fusion map after all key frames are obtained from all point cloud images.

Figure 3:
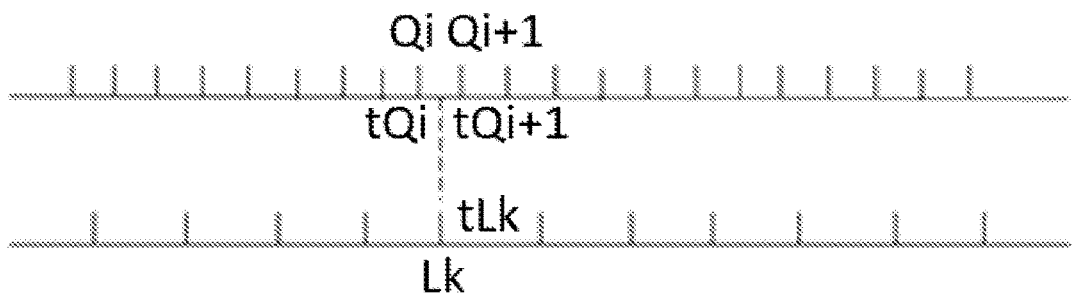
FIG. 3 shows a schematic diagram illustrating a method provided in the present disclosure for obtaining the position and the attitude corresponding to a frame point cloud image in a local three-dimensional laser point cloud image with the time difference method.

FIG. 3 shows a schematic diagram illustrating a method for obtaining the position and the attitude corresponding to a frame point cloud image in a local three-dimensional laser point cloud image with time interpolation method.

Set the current laser frame as $L_k$, and the corresponding time stamp is $t_{L_k}$. In the visual frame sequence, the most adjacent frame of the visual frame sequence with less time than $L_k$ is $Q_i$, and the most adjacent frame with more time is $Q_{i+1}$. Therefore, it may be obtained that the attitude information of $Q_i$ and $Q_{i+1}$ is $q_i$ and $q_{i+1}$, respectively, and the position information thereof is $p_i$ and $p_{i+1}$, respectively. The position and the attitude of the laser frame $L_k$ may be obtained with time interpolation. Please refer to the following formulae for details:

$$q_{L_k} = \frac{\sin\left(\left(1 - \frac{t_{L_k} - t_{Q_i}}{t_{Q_{i+1}} - t_{Q_i}}\right)\omega\right) q_i + \sin\left(\frac{t_{L_k} - t_{Q_i}}{t_{Q_{i+1}} - t_{Q_i}}\omega\right) q_{i+1}}{\sin \omega} \quad \text{(Formula 6)}$$

$$p_{L_k} = \left(1 - \frac{t_{L_k} - t_{Q_i}}{t_{Q_{i+1}} - t_{Q_i}}\right) p_i + \frac{t_{L_k} - t_{Q_i}}{t_{Q_{i+1}} - t_{Q_i}} p_{i+1} \quad \text{(Formula 7)}$$

wherein, $q_{L_k}$ is the attitude of the laser frame $L_k$, $p_{L_k}$ is the position of the laser frame $L_k$, $t_{Q_{i+1}}$ is the time stamp corresponding to the visual frame sequence $Q_{i+1}$, and $t_{Q_i}$ is the time stamp corresponding to the visual frame sequence $Q_i$.

The position and attitude error of the laser frame obtained above is relatively large, which needs to be further optimized with the characteristics of the laser radar. Therefore, the following need to be performed:

Firstly, a local point cloud map is maintained. The initial first h frames are added to the local map as key frames. When there is a new frame, the point cloud of the current frame image is used to find the corresponding relationship with the point cloud of the local map, and a least square issue is constructed through the corresponding relationship of points to optimize the position and the attitude. A position difference and an attitude difference between the current frame image and the latest key frame is determined. Where the differences are less than the set threshold, the current frame of image is determined as a non-key frame, otherwise is determined as a key frame. Finally, where the current frame image is a key frame, the point cloud of the current frame image is inserted into the local map.

In some embodiments, performing an optimization on position and attitude for a newly added point cloud image may comprise:

Searching for n adjacent corner points corresponding to each corner point in one newly added frame point cloud image, respectively, from a corner point set corresponding to the local point cloud map, and searching for j adjacent planar points corresponding to each planar point in one newly added frame point cloud image, respectively, from a planar point set corresponding to the local point cloud map;

calculating eigenvalues of the n adjacent corner points corresponding to a first corner point, and eigenvalues of the j adjacent planar points corresponding to a first planar point, respectively;

extracting a first preset number of points in a linear line defined by the n adjacent corner points where the adjacent points corresponding to the first corner point are determined to appear linear features according to the eigenvalues corresponding to the n adjacent corner points, respectively;

extracting a second preset number of points in a spatial plane defined by the j adjacent planar points where the adjacent points corresponding to the first planar point are determined to appear planar features according to the eigenvalues corresponding to the j adjacent planar points, respectively;

constructing a cost function according to a corresponding relationship between the first preset number of points and a line of the first preset number of points, a corresponding relationship between the second preset number of points and a spatial plane of the second preset number of points, and a position and an attitude of the one newly added frame point cloud image; and performing an optimization on position and attitude for the one newly added frame point cloud image with the cost function, wherein the first corner point is any corner point in the one newly added frame point cloud image, the first planar point is any planar point in the one newly added frame point cloud image, and both n and j are positive integers.

In some embodiments, firstly for each point $P_i^{corner}$ in the set of corner points of the current frame image, n most adjacent points are searched in the set of corner points $S_{submap}^{corner}$ of the local map, and the eigenvalues of n points are calculated with principle components analysis (PCA). Where the largest eigenvalue is much larger than the other two eigenvalues, it is considered that the proximal point $P_i^{corner}$ has linear characteristics, and two points $P_{c\_j}^{map}$ and $P_{c\_l}^{map}$ on the spatial line defined by n points are selected. Similarly, for each point $P_i^{surface}$ in the set of planar points of the current frame image, j most surface adjacent corner points are searched in the set of planar points $S_{submap}^{surface}$ of the local map, and the eigenvalues are calculated with PCA. Where the largest eigenvalue is close to the second largest eigenvalue and far more than the least eigenvalue, it is considered that the proximal point $P_i^{surface}$ has planar characteristics, and three points $P_{s\_j}^{map}$, $P_{s\_l}^{map}$ and $P_{s\_m}^{map}$ on the spatial plane defined by j points are selected. According to the above one-to-one corresponding relationship between points and lines, and between points and planes, a nonlinear optimization model may be constructed based on the position and the attitude of the current frame image as state variables. Let the Lie algebra corresponding to the position and the attitude of the current frame image be $\xi_{L_k}$, then a cost function may be constructed:

$$f_{\xi_L} = \arg\min_\xi \frac{1}{2} \quad \text{(Formula 8)}$$

$$\sum \left( \left\| \left( \exp(\xi) P_i^{corner} - P_{c\_j}^{map} \right)^\wedge \left( \exp(\xi) P_i^{corner} - P_{c\_l}^{map} \right) \right\|^2 + \right.$$
$$\left\| \left( \exp(\xi) P_i^{surface} - P_{s\_j}^{map} \right)^\wedge \left( \left( \exp(\xi) P_i^{surface} - P_{s\_l}^{map} \right)^\wedge \right. \right.$$
$$\left. \left. \left( \exp(\xi) P_i^{surface} - P_{s\_m}^{map} \right) \right) \right\|^2 \right)$$

The above cost functions represent the distance between the point and the line defined by the corresponding points, and the distance between the point and the plane defined by the corresponding points, respectively. By constructing the cost function as shown in Formula 6, the optimal attitude of the current frame image may be obtained with L-M (Levenberg-Marquardt) method. Therefore, an optimization on position and attitude may be performed for a newly added point cloud image.

In some embodiments, in S140, although a local map is added to perform local optimization, only local features are considered. When the map is constructed long enough, the accumulated error will become larger and larger. When the same position is reached for the second time, due to the accumulated error, the position and the attitude of the same position will vary greatly and result in map errors. Therefore, consistency optimization needs to be carried out with loop closure detection.

In some embodiments, performing a global consistency optimization on a global map according to the local fusion map to obtain a dense point cloud map and output a current position information and a current attitude information in real time so as to complete the simultaneous localization and mapping (SLAM) may comprise:

acquiring an adjacent frame of image corresponding to a first frame fusion image in the local fusion map with a laser loop closure detection;

acquiring a relative position and attitude between the first frame of fusion image and the adjacent frame of image; and performing a global consistency optimization on a global map according to each frame fusion image in the local fusion map, an adjacent frame image corresponding to each frame fusion image, and a relative position between the each frame fusion image and the adjacent frame image, to obtain a dense point cloud map and output a current position information and a current attitude information in real time so as to complete the simultaneous localization and mapping (SLAM), wherein the first frame fusion image is any frame fusion image in the local fusion map.

In some embodiments, as the laser map is composed of discrete three-dimensional points, it is difficult to determine the similar position through the discrete information. However, vision can be used to construct a bag-of-words model, so that it can be determined whether the current position and the historical position are adjacent positions. After they are determined to be the same position, feature matching is performed between the two frame images, and PnP method is used to construct the cost function as shown in Formula 5 to obtain the relative position and attitude between the two frames. The relative position and attitude obtained is used as an initial value of the relative position and attitude of the laser frames corresponding to the two frame images to match the local maps corresponding to the two frame laser point clouds, and the relative position and attitude can be optimized with a formula similar to Formula 6 to obtain an optimal estimation value. Finally, the relative position and attitude are substituted into the global position and attitude diagram constructed by the laser key frames for overall optimization to obtain a dense point cloud map with global consistency.

Figure 4:
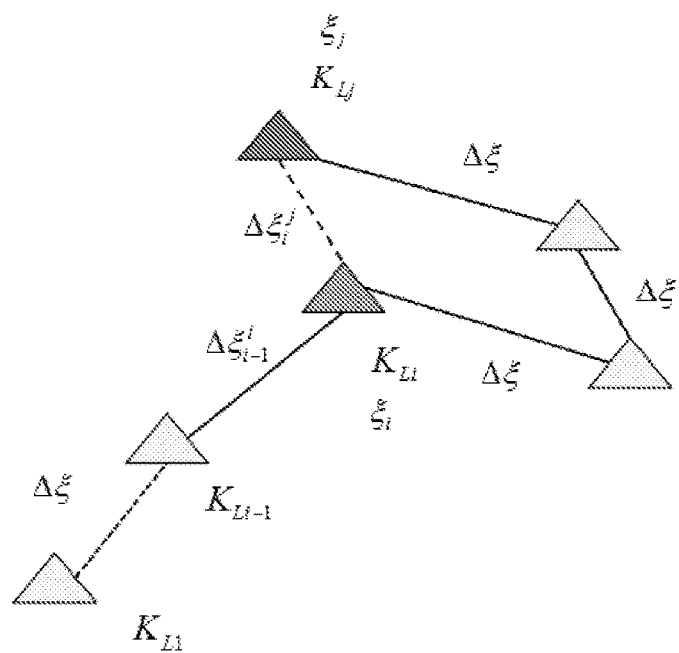
FIG. 4 shows a laser position and attitude diagram constructed by laser key frames provided in the present disclosure.

Please refer to FIG. 4 for details. FIG. 4 shows a laser position and attitude diagram constructed by the laser key frames. The edge formed between adjacent key frames is the relative position and attitude $\Delta \xi$ between two frames. Assuming that the current frame of image is $K_{L_i}$, it is detected to be adjacent with laser frame $K_{L_j}$ with the above loop closure detection, and the relative position and attitude $\xi_i^j$ between the two frames may be obtained with a formula similar to Formula 5. A cost function may be constructed to make optimal estimation for the state, in which the position and attitude of each frame is considered as the state variables $\psi=[\xi_1, \xi_2, \ldots, \xi_j]$, such as the position and attitude of the frame $K_{L_i}$ is $\xi_i$. Please refer to the following formula for details:

$$f_\psi = \min \arg_\psi \frac{1}{2} \quad \text{(Formula 9)}$$

$$\sum \left( \left\| \ln \left( \exp\left( (-\Delta \xi_i^j)^\wedge \right) \exp((-\xi_i)^\wedge) \exp((-\xi_j)^\wedge)^\wedge \right) \right\|^2 \right)$$

Therefore, a dense point cloud map with global consistency can be obtained, and the current position information and the current attitude information are output in real time to complete the simultaneous localization and mapping (SLAM).

The method for simultaneous localization and mapping (SLAM) of the present disclosure may comprise acquiring a local binocular vision image and a local three-dimensional laser point cloud image that can be collected at present, and preprocessing the local binocular vision image and the local three-dimensional laser point cloud image, respectively. The preprocessed local binocular vision image is fused with the preprocessed local three-dimensional laser point cloud image to obtain a local fusion map. The acquisition of the local fusion map is actually a process of optimizing the preprocessed local three-dimension laser point cloud image with the preprocessed local binocular vision image, that is optimizing the local map. After acquiring the locally optimized fusion map, the global consistency is optimized on the global map according to the local fusion map to obtain the dense point cloud map. The fusion of binocular vision image and three-dimensional laser point cloud image can overcome the issues that three-dimension laser fails easily in the scene with few feature structures, realize high-precision estimation of position, attitude and other state variables, and output dense three-dimensional point cloud image with global consistency. During the process, according to the trajectory fusion method of time interpolation, the visual trajectory and laser radar trajectory are fused with the characteristics of time difference and attitude quaternion. Moreover, the issue that laser radar is difficult to detect the global similarity because it only has three-dimensional discrete points is resolved by loop closure detection, which renders robust. Finally, according to the dense three-dimensional point cloud image, the current position information per se can be determined in real time to complete the simultaneous localization and mapping (SLAM).

Figure 5:
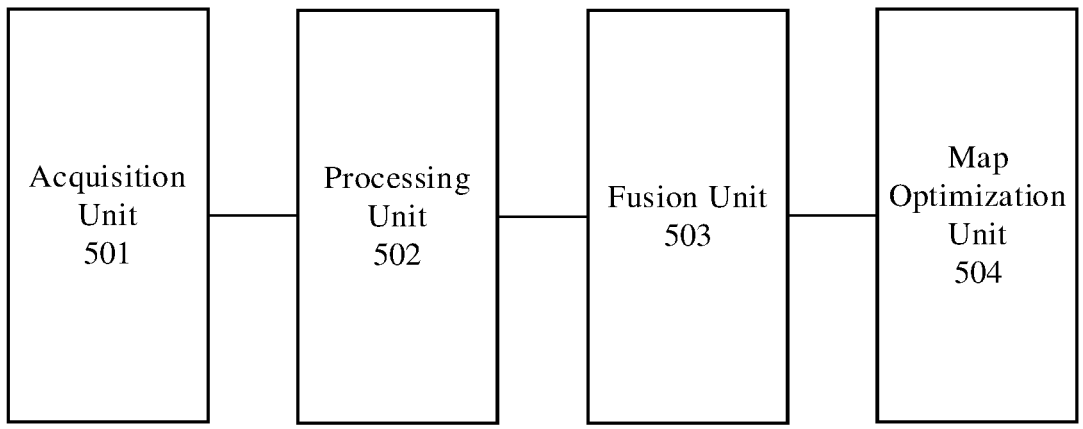
FIG. 5 shows a schematic diagram illustrating a structure of a device for simultaneous localization and mapping (SLAM) provided in one example of the present disclosure.

FIG. 5 shows a device for simultaneous localization and mapping (SLAM) provided in one example of the present disclosure. The device may comprise: an acquisition unit 501, a processing unit 502, a fusion unit 503 and a map optimization unit 504.

In some embodiments, the acquisition unit 501 may be adapted to acquire a local binocular vision image and a local three-dimensional laser point cloud image that can be collected at present, and acquire a position and an attitude of a local binocular vision map according to the preprocessed local binocular vision image.

In some embodiments, the processing unit 502 may be adapted to preprocess the local binocular vision image and the local three-dimensional laser point cloud image, respectively.

In some embodiments, the fusion unit 503 may be adapted to fuse the position and the attitude of the local binocular vision map with the preprocessed local three-dimensional laser point cloud image to obtain a local fusion map.

In some embodiments, the map optimization unit 504 may be adapted to perform a global consistency optimization on a global map according to the local fusion map to obtain a dense point cloud map and output a current position information and a current attitude information in real time so as to complete simultaneous localization and mapping (SLAM), wherein the global map is constructed according to the global three-dimensional laser point cloud image.

In some embodiments, the processing unit 502 may be adapted to extract features of the local binocular vision image to obtain feature points of the local binocular vision image;
 select a specific feature point meeting a preset condition from the feature points of the local binocular vision image;
 calculate a feature descriptor of the specific feature point; and
 perform a feature matching for the binocular visual image according to the feature descriptor, so as to construct a local map according to the local binocular visual image obtained after the feature matching.

In some embodiments, the processing unit 502 may be adapted to extract ground points and non-ground points from the three-dimensional laser point cloud image;
 distinguish corner points and planar points in the ground points, and distinguish corner points and planar points in the non-ground points according to a preset method; and
 combine the corner points in the ground points and the corner points in the non-ground points together to form a corner point set, and combine the planar points in the ground points and the planar points in the non-ground points together to form a planar point set.

In some embodiments, the processing unit 502 may be adapted to perform local map tracking according to the preprocessed local binocular vision image; and
 optimize a currently obtained local map during map tracking to obtain the position and an attitude of the local binocular vision map.

In some embodiments, the processing unit 502 may be adapted to insert a first frame image of the preprocessed local binocular vision image into a local map as a key frame;
 match the feature points between the first frame image as a reference frame and a newly added current frame image;
 calculate a position difference and/or a rotation angle difference between the first frame image and the current frame image according to matched feature points between the first frame image and the current frame image;
 insert the current frame image into the local map where the current frame image is determined as a key frame according to the position difference and/or the rotation angle difference; and
 repeat above operations for a next newly added frame image until all frame images in the local binocular vision image are processed to complete the local map tracking.

In some embodiments, the processing unit 502 may be adapted to determine the current frame image as a key frame where a position difference between the first frame image and the current frame image is calculated, and the position difference is greater than or equal to a first preset threshold;
 or determine the current frame image as a key frame where a rotation angle difference between the first frame image and the current frame image is calculated, and the rotation angle difference is greater than or equal to a second preset threshold;
 or determine the current frame image as a key frame where a position difference and a rotation angle difference between the first frame image and the current frame image are calculated, and both the position difference and the rotation angle difference are greater than or equal to the corresponding preset thresholds.

In some embodiments, the processing unit 502 may be adapted to select other key frames satisfying a common view relationship with a new key frame from the currently obtained local map after the new key frame is determined to be inserted into the local map;
 perform a least squares estimation for residuals between all key frames satisfying the common view relationship with local bundle adjustment; and
 acquire the position and the attitude of the local binocular vision map where the residuals are determined to fall into a preset space range.

In some embodiments, the fusion unit 503 may be adapted to determine a position and an attitude corresponding to each frame point cloud image in the preprocessed local three-dimensional laser point cloud image with a time interpolation method according to the position and the attitude of the local binocular vision map and the preprocessed local three-dimensional laser point cloud image;
 extract a point cloud image with a preset frame number from the preprocessed local three-dimensional laser point cloud image to construct a local point cloud map; and
 determine a first frame point cloud image in the local point cloud map as a key frame point cloud image.

In some embodiments, the map optimization unit 504 may be adapted to perform an optimization on position and attitude for a newly added point cloud image.

In some embodiments, the processing unit 502 may be further adapted to determine a position difference and/or an attitude difference between a point cloud image with an optimized position and attitude and the key frame of point cloud image;
 add the point cloud image with an optimized position and attitude to the local point cloud map after the point cloud image with an optimized position and attitude is determined as a key frame according to the position difference and/or the attitude difference between the point cloud image with an optimized position and attitude and the key frame of point cloud image; and
 construct a local fusion map after all key frames are obtained from all point cloud images where the point cloud image with an optimized position and attitude is determined as a current key frame.

In some embodiments, the map optimization unit 504 may be further adapted to search for n adjacent corner points corresponding to each corner point in one newly added frame point cloud image, respectively, from a corner point set corresponding to the local point cloud map, and search for j adjacent planar points corresponding to each planar point in one newly added frame point cloud image, respectively, from a planar point set corresponding to the local point cloud map;

calculate eigenvalues of the n adjacent corner points corresponding to a first corner point, and eigenvalues of the j adjacent planar points corresponding to a first flat point, respectively;

extract a first preset number of points in a linear line defined by the n adjacent corner points where the adjacent points corresponding to the first corner point are determined to appear linear features according to the eigenvalues corresponding to the n adjacent corner points, respectively;

extract a second preset number of points in a spatial plane defined by the j adjacent planar points where the adjacent points corresponding to the first planar point are determined to appear planar features according to the eigenvalues corresponding to the j adjacent planar points, respectively;

construct a cost function according to a corresponding relationship between the first preset number of points and a line of the first preset number of points, a corresponding relationship between the second preset number of points and a spatial plane of the second preset number of points, and a position and an attitude of the one newly added frame point cloud image; and perform an optimization on position and attitude for the one newly added frame point cloud image with the cost function, wherein the first corner point is any corner point in the one newly added frame point cloud image, the first planar point is any planar point in the one newly added frame point cloud image, and both n and j are positive integers.

In some embodiments, the map optimization unit 504 may be adapted to acquire an adjacent frame image corresponding to a first frame fusion image in the local fusion map with a laser loop closure detection;

acquire a relative position and attitude between the first frame fusion image and the adjacent frame image; and perform a global consistency optimization on a global map according to each frame fusion image in the local fusion map, an adjacent frame image corresponding to each frame fusion image, and a relative position between the each frame fusion image and the adjacent frame image, to obtain a dense point cloud map and output a current position information and a current attitude information in real time so as to complete the simultaneous localization and mapping (SLAM), wherein the first frame fusion image is any frame fusion image in the local fusion map.

The functions performed by each functional component in the device for simultaneous localization and mapping (SLAM) provided in the present example have been described in detail in the example corresponding to FIG. 1. Therefore, it will not be repeated here.

The device for simultaneous localization and mapping (SLAM) of the present disclosure may acquire a local binocular vision image and a local three-dimensional laser point cloud image that can be collected at present, and preprocess the local binocular vision image and the local three-dimensional laser point cloud image, respectively. The preprocessed local binocular vision image is fused with the preprocessed local three-dimensional laser point cloud image to obtain a local fusion map. The acquisition of the local fusion map is actually a process of optimizing the preprocessed local three-dimensional laser point cloud image with the preprocessed local binocular vision image, that is optimizing the local map. After acquiring the locally optimized fusion map, the global consistency is optimized on the global map according to the local fusion map to obtain the dense point cloud map. The fusion of binocular vision image and three-dimensional laser point cloud image can overcome the issues that three-dimension laser fails easily in the scene with few feature structures, realize high-precision estimation of position, attitude and other state variables, and output dense three-dimensional point cloud image with global consistency. During the process, according to the trajectory fusion method of time interpolation, the visual trajectory and laser radar trajectory are fused with the characteristics of time difference and attitude quaternion. Moreover, the issue that laser radar is difficult to detect the global similarity because it only has three-dimensional discrete points is resolved by loop closure detection, which renders robust. Finally, according to the dense three-dimensional point cloud image, the current position information per se can be determined in real time to complete the simultaneous localization and mapping (SLAM).

Figure 6:
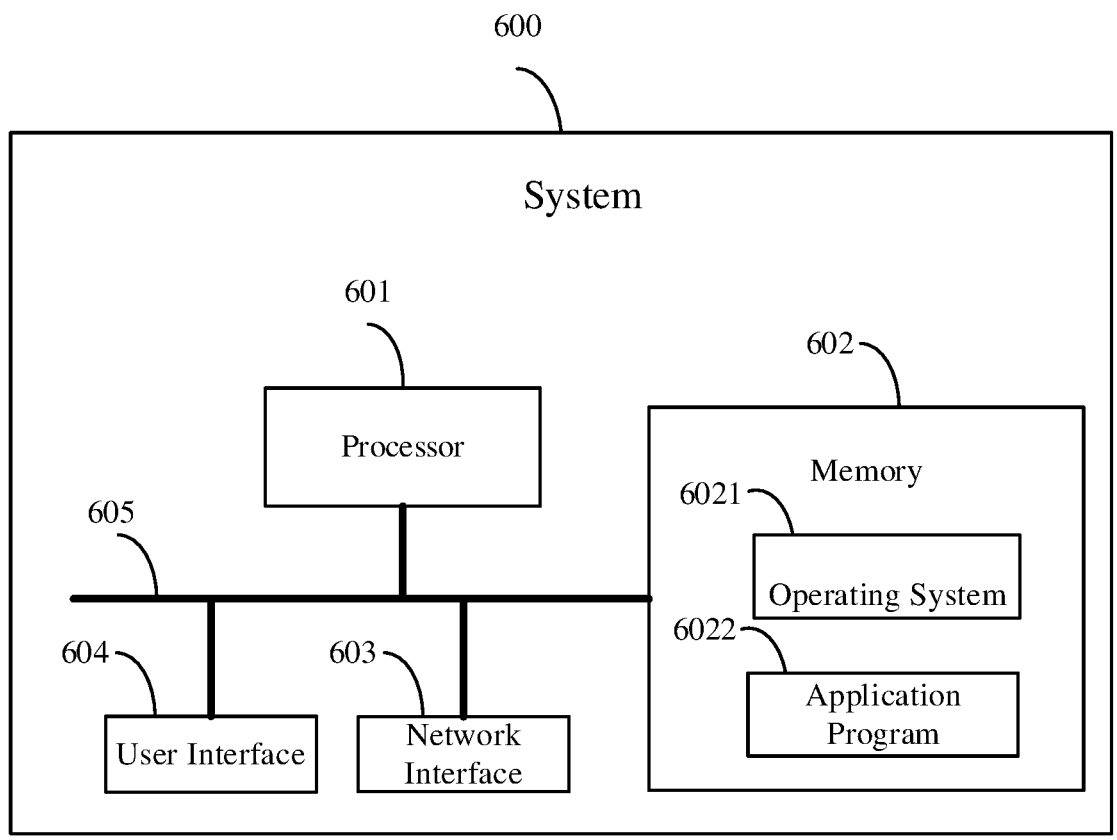
FIG. 6 shows a schematic diagram illustrating a structure of a system for simultaneous localization and mapping (SLAM) provided in one example of the present disclosure.

FIG. 6 shows a schematic diagram illustrating a structure of a device for simultaneous localization and mapping (SLAM) provided in one example of the present disclosure. The system for simultaneous localization and mapping (SLAM) 600 shown in FIG. 6 comprises: at least one processor 601, a memory 602, at least one network interface 603 and another user interface 604. The components in the system for simultaneous localization and mapping (SLAM) 600 are coupled together through the bus system 605. It can be understood that the bus system 605 is used for the connection and communication between these components. In addition to a data bus, the bus system 605 comprises a power bus, a control bus and a state signal bus. However, for the purpose of clear explanation, the various buses are labeled as bus system 605 in FIG. 6.

In some embodiments, the user interface 604 may comprise a display, a keyboard or a clicking device (e.g., a mouse, a trackball), a touch pad, a touch screen, etc.

The memory 602 in the present disclosure may be a volatile memory or a non-volatile memory or may comprise both the volatile memory and the non-volatile memory. The non-volatile memory may be an ROM (Read-Only Memory), a PROM (Programmable ROM), an EPROM (Erasable PROM), an EEPROM (Electrically EPROM) or a flash memory. The volatile memory may be an RAM (i.e., Random Access Memory) which is used as an external high-speed cache. By exemplary description rather than restrictive description, there are many forms of RAMs that may be used, such as an SRAM (Static RAM), a DRAM (Dynamic RAM), an SDRAM (Synchronous DRAM), a DDRSDRAM (Double Data Rate SDRAM), an ESDRAM (Enhanced SDRAM), an SLDRAM (Synch Link DRAM) and a DRRAM (Direct Rambus RAM). The memory 602 described herein is intended to comprise, but not limited to, these memories and any other appropriate types of memories.

In some embodiments, the memory 602 stores the following elements, executable unit or data structure, subsets thereof, or extensions thereof: the operating system 6021 and the application program 6022.

In some embodiments, the operating system 6021 comprises various system programs, such as framework layer, core library layer, driver layer, which are used to realize a variety of basic business and process hardware based tasks. The application program 6022 comprises various applications, such as media player, browser, etc., which are used to realize various application services. The program for realizing the method of the present disclosure may be comprised in the application program 6022.

In the present disclosure, by calling the program or instructions stored in the memory 602, specifically, the program or instructions stored in the application program 6022, the processor 601 is used to carry out the method of the present disclosure. For example, the method may comprise:

acquiring a local binocular vision image and a local three-dimensional laser point cloud image that can be collected at present;

preprocessing the local binocular vision image and the local three-dimensional laser point cloud image respectively;

acquiring a position and an attitude of a local binocular vision map according to the preprocessed local binocular vision image;

fusing the position and the attitude of the local binocular vision map with the preprocessed local three-dimensional laser point cloud image to obtain a local fusion map; and performing a global consistency optimization on a global map according to the local fusion map to obtain a dense point cloud map and output a current position information and a current attitude information in real time so as to complete the simultaneous localization and mapping (SLAM), wherein the global map is constructed according to a global three-dimensional laser point cloud image.

In some embodiments, preprocessing the local binocular vision image may comprise:

extracting features of the local binocular vision image to obtain feature points of the local binocular vision image;

selecting a specific feature point meeting a preset condition from the feature points of the local binocular vision image;

calculating a feature descriptor of the specific feature point; and performing a feature matching for the binocular visual image according to the feature descriptor, so as to construct a local map according to the local binocular visual image obtained after the feature matching.

In some embodiments, preprocessing the local three-dimensional laser point cloud image may comprise:

extracting ground points and non-ground points from the three-dimensional laser point cloud image;

distinguishing corner points and planar points in the ground points, and distinguishing corner points and planar points in the non-ground points according to a preset method; and combining the corner points in the ground points and the corner points in the non-ground points together to form a corner point set, and combining the planar points in the ground points and the planar points in the non-ground points together to form a planar point set.

In some embodiments, acquiring a position and an attitude of a local binocular vision map according to the preprocessed local binocular vision image may comprise:

performing local map tracking according to the preprocessed local binocular vision image; and optimizing a currently obtained local map during map tracking to obtain the position and the attitude of the local binocular vision map.

In some embodiments, performing local map tracking according to the preprocessed local binocular vision image may comprise:

inserting a first frame image of the preprocessed local binocular vision image into a local map as a key frame;

matching the feature points between the first frame image as a reference frame and a newly added current frame image;

calculating a position difference and/or a rotation angle difference between the first frame image and the current frame image according to matched feature points between the first frame image and the current frame image;

inserting the current frame image into the local map where the current frame image is determined as a key frame according to the position difference and/or the rotation angle difference; and repeating above operations for a next newly added frame image until all frame images in the local binocular vision image are processed to complete the local map tracking.

In some embodiments, determining the current frame image as a key frame according to the position difference and/or the rotation angle difference may comprise:

determining the current frame image as a key frame where a position difference between the first frame image and the current frame image is calculated, and the position difference is greater than or equal to a first preset threshold;

or determining the current frame image as a key frame where a rotation angle difference between the first frame image and the current frame image is calculated, and the rotation angle difference is greater than or equal to a second preset threshold;

or determining the current frame image as a key frame where a position difference and a rotation angle difference between the first frame image and the current frame image are calculated, and both the position difference and the rotation angle difference are greater than or equal to the corresponding preset thresholds.

In some embodiments, optimizing the currently obtained local map during map tracking to obtain the position and the attitude of the local binocular vision map may comprise:

selecting other key frames satisfying a common view relationship with a new key frame from the currently obtained local map after the new key frame is determined to be inserted into the local map;

performing a least squares estimation for residuals between all key frames satisfying the common view relationship with local bundle adjustment; and acquiring the position and the attitude of the local binocular vision map where the residuals are determined to fall into a preset space range.

In some embodiments, fusing the position and the attitude of the local binocular vision map with the preprocessed local three-dimensional laser point cloud image to obtain a local fusion map may comprise:

determining a position and an attitude corresponding to each frame point cloud image in the preprocessed local three-dimensional laser point cloud image with a time interpolation method according to the position and the attitude of the local binocular vision map and the preprocessed local three-dimensional laser point cloud image;

extracting a point cloud image with a preset frame number from the preprocessed local three-dimensional laser point cloud image to construct a local point cloud map;

determining a first frame point cloud image in the local point cloud map as a key frame point cloud image;

performing an optimization on position and attitude for a newly added point cloud image;

determining a position difference and/or an attitude difference between a point cloud image with an optimized position and attitude and the key frame of point cloud image;

adding the point cloud image with an optimized position and attitude to the local point cloud map after the point cloud image with an optimized position and attitude is determined as a key frame according to the position difference and/or the attitude difference between the point cloud image with an optimized position and attitude and the key frame point cloud image; and constructing a local fusion map after all key frames are obtained from all point cloud images where the point cloud image with an optimized position and attitude is determined as a current key frame.

In some embodiments, performing an optimization on position and attitude for a newly added point cloud image may comprise:

searching for n adjacent corner points corresponding to each corner point in one newly added frame point cloud image, respectively, from a corner point set corresponding to the local point cloud map, and searching for j adjacent planar points corresponding to each planar point in one newly added frame point cloud image, respectively, from a planar point set corresponding to the local point cloud map;

calculating eigenvalues of the n adjacent corner points corresponding to a first corner point, and eigenvalues of the j adjacent planar points corresponding to a first planar point, respectively;

extracting a first preset number of points in a linear line defined by the n adjacent corner points where the adjacent points corresponding to the first corner point are determined to appear linear features according to the eigenvalues corresponding to the n adjacent corner points, respectively;

extracting a second preset number of points in a spatial plane defined by the j adjacent planar points where the adjacent points corresponding to the first planar point are determined to appear planar features according to the eigenvalues corresponding to the j adjacent flat points, respectively;

constructing a cost function according to a corresponding relationship between the first preset number of points and a line of the first preset number of points, a corresponding relationship between the second preset number of points and a spatial plane of the second preset number of points, and a position and an attitude of the one newly added frame point cloud image; and performing an optimization on position and attitude for the one newly added frame point cloud image with the cost function, wherein the first corner point is any corner point in the one newly added frame point cloud image, the first planar point is any planar point in the one newly added frame point cloud image, and both n and j are positive integers.

In some embodiments, performing a global consistency optimization on a global map according to the local fusion map to obtain a dense point cloud map and output a current position information and a current attitude information in real time so as to complete the simultaneous localization and mapping (SLAM) may comprise:

acquiring an adjacent frame image corresponding to a first frame fusion image in the local fusion map with a laser loop closure detection;

acquiring a relative position and attitude between the first frame fusion image and the adjacent frame image; and performing a global consistency optimization on a global map according to each frame fusion image in the local fusion map, an adjacent frame image corresponding to each frame fusion image, and a relative position between the each frame fusion image and the adjacent frame image, to obtain a dense point cloud map and, output a current position information and a current attitude information in real time so as to complete the simultaneous localization and mapping (SLAM), wherein the first frame fusion image is any frame fusion image in the local fusion map.

The method disclosed in the present disclosure may be applied in the processor 601 or realized by the processor 601. The processor 601 may be an integrated circuit chip with signal processing capability. During realization, the above-mentioned method may be carried out by hardware integrated logic circuits or software instructions in the processor 601. The above processor 601 may be a general-purpose processor, a DSP (Digital Signal Processor), an ASIC (Application Specific Integrated Circuit), an FPGA (Field Programmable Gate Array) or other programmable logic devices, a discrete gate or transistor logic device and a discrete hardware component. Each of the method, step and logic diagram disclosed in the present disclosure may be carried out or executed. The general-purpose processor may be a microprocessor or any conventional processor. Steps of the method disclosed in the present disclosure may be directly embodied to be executed and completed by a hardware decoding processor or by a combination of hardware and software units in the decoding processor. The software unit may be located in a storage medium such as an RAM, a flash memory, an ROM, a PROM or an EEPROM, a register and any storage medium known in the art. The storage medium is located in the memory 602, and the processor 601 reads information in the memory 602 and carries out the above-mentioned method in combination with its hardware.

The examples described herein may be realized by hardware, software, firmware, middleware, microcode or a combination thereof. For hardware realization, a processing unit may be realized in one or more ASICs (Application Specific Integrated Circuits), DSPs (Digital Signal Processors), DSPDs (DSP Devices), PLDs (Programmable Logic Devices), FPGAs (Field-Programmable Gate Arrays), general-purpose processors, controllers, microcontrollers, microprocessors, other electronic units for executing the functions of the present disclosure or a combination thereof.

For software realization, the technology described herein may be realized by units for carrying out the functions described herein. Software codes may be stored in the memory and executed by the processor. The memory may be implemented inside or outside the processor.

The system for simultaneous localization and mapping (SLAM) provided in the present example may be the system for simultaneous localization and mapping (SLAM) as shown in FIG. 6, which may carry out the method for simultaneous localization and mapping (SLAM) as shown in FIG. 1, so as to realize the technical effect of the method for simultaneous localization and mapping (SLAM) as shown in FIG. 1. Please refer to the relevant description of FIG. 1 for details, and for the purpose of brief description, it will not be repeated here.

In still yet another aspect, the present disclosure relates to a storage medium, such as computer-readable storage medium. One or more programs are stored on the storage medium. The storage medium may comprise a volatile memory, such as a random access memory. The memory may comprise a non-volatile memory, such as a read-only memory, a flash memory, a hard disk or a solid state hard disk. The memory may also comprise a combination of the above types of memories.

In some embodiments, one or more programs on the storage medium can be executed by one or more processors to realize a method for simultaneous localization and mapping (SLAM) in a system for simultaneous localization and mapping (SLAM).

The processor is used to execute a program for simultaneous localization and mapping (SLAM) stored in the memory to carry out the method for simultaneous localization and mapping (SLAM), comprises:
  acquiring a local binocular vision image and a local three-dimensional laser point cloud image that can be collected at present;
  preprocessing the local binocular vision image and the local three-dimensional laser point cloud image respectively;
  acquiring a position and an attitude of a local binocular vision map according to the preprocessed local binocular vision image;
  fusing the position and the attitude of the local binocular vision map with the preprocessed local three-dimensional laser point cloud image to obtain a local fusion map; and
  performing a global consistency optimization on a global map according to the local fusion map to obtain a dense point cloud map and output a current position information and a current attitude information in real time so as to complete the simultaneous localization and mapping (SLAM), wherein the global map is constructed according to a global three-dimensional laser point cloud image.

In some embodiments, preprocessing the local binocular vision image may comprise:
  extracting features of the local binocular vision image to obtain feature points of the local binocular vision image;
  selecting a specific feature point meeting a preset condition from the feature points of the local binocular vision image;
  calculating a feature descriptor of the specific feature point; and
  performing a feature matching for the binocular visual image according to the feature descriptor, so as to construct a local map according to the local binocular visual image obtained after the feature matching.

In some embodiments, preprocessing the local three-dimensional laser point cloud image may comprise:
  extracting ground points and non-ground points from the three-dimensional laser point cloud image;
  distinguishing corner points and planar points in the ground points, and distinguishing corner points and planar points in the non-ground points according to a preset method; and
  combining the corner points in the ground points and the corner points in the non-ground points together to form a corner point set, and combining the planar points in the ground points and the planar points in the non-ground points together to form a planar point set.

In some embodiments, acquiring a position and an attitude of a local binocular vision map according to the preprocessed local binocular vision image may comprise:
  performing local map tracking according to the preprocessed local binocular vision image; and
  optimizing the currently obtained local map during map tracking to obtain a position and an attitude of a local binocular vision map.

In some embodiments, performing local map tracking according to the preprocessed local binocular vision image may comprise:
  inserting a first frame image of the preprocessed local binocular vision image into a local map as a key frame;
  matching the feature points between the first frame image as a reference frame and a newly added current frame image;
  calculating a position difference and/or a rotation angle difference between the first frame image and the current frame image according to matched feature points between the first frame image and the current frame image;
  inserting the current frame image into the local map where the current frame of image is determined as a key frame according to the position difference and/or the rotation angle difference; and
  repeating above operations for a next newly added frame image until all frame images in the local binocular vision image are processed to complete the local map tracking.

In some embodiments, determining the current frame image as a key frame according to the position difference and/or the rotation angle difference may comprise:
  determining the current frame image as a key frame where a position difference between the first frame image and the current frame image is calculated, and the position difference is greater than or equal to a first preset threshold;
  or determining the current frame image as a key frame where a rotation angle difference between the first frame image and the current frame image is calculated, and the rotation angle difference is greater than or equal to a second preset threshold;
  or determining the current frame image as a key frame where a position difference and a rotation angle difference between the first frame image and the current frame image are calculated, and both the position difference and the rotation angle difference are greater than or equal to the corresponding preset thresholds.

In some embodiments, optimizing the currently obtained local map during map tracking to obtain the position and the attitude of the local binocular vision map may comprise:
  selecting other key frames satisfying a common view relationship with a new key frame from the currently obtained local map after the new key frame is determined to be inserted into the local map;
  performing a least squares estimation for residuals between all key frames satisfying the common view relationship with local bundle adjustment; and
  acquiring the position and the attitude of the local binocular vision map where residuals are determined to fall into a preset space range.

In some embodiments, the fusing the position and the attitude of the local binocular vision map with the preprocessed local three-dimensional laser point cloud image to obtain a local fusion map may comprise:
  determining a position and an attitude corresponding to each frame point cloud image in the preprocessed local three-dimensional laser point cloud image with a time interpolation method according to the position and the attitude of the local binocular vision map and the preprocessed local three-dimensional laser point cloud image;
  extracting a point cloud image with a preset frame number from the preprocessed local three-dimensional laser point cloud image to construct a local point cloud map;
  determining a first frame point cloud image in the local point cloud map as a key frame point cloud image;
  performing an optimization on position and attitude for a newly added point cloud image;
  determining a position difference and/or an attitude difference between a point cloud image with an optimized position and attitude and the key frame point cloud image;
  adding the point cloud image with an optimized position and attitude to the local point cloud map after the point cloud image with an optimized position and attitude is determined as a key frame according to the position difference and/or the attitude difference between the point cloud image with an optimized position and attitude and the key frame point cloud image; and
  constructing a local fusion map after all key frames are obtained from all point cloud images where the point cloud image with an optimized position and attitude is determined as a current key frame.

In some embodiments, performing an optimization on position and attitude for a newly added point cloud image may comprise:
  searching for n adjacent corner points corresponding to each corner point in one newly added frame point cloud image, respectively, from a corner point set corresponding to the local point cloud map, and searching for j adjacent planar points corresponding to each planar point in one newly added frame point cloud image, respectively, from a planar point set corresponding to the local point cloud map;
  calculating eigenvalues of the n adjacent corner points corresponding to a first corner point, and eigenvalues of the j adjacent planar points corresponding to a first planar point, respectively;
  extracting a first preset number of points in a linear line defined by the n adjacent corner points where the adjacent points corresponding to the first corner point are determined to appear linear features according to the eigenvalues corresponding to the n adjacent corner points, respectively;
  extracting a second preset number of points in a spatial plane defined by the j adjacent planar points where the adjacent points corresponding to the first planar point are determined to appear planar features according to the eigenvalues corresponding to the j adjacent planar points, respectively;
  constructing a cost function according to a corresponding relationship between the first preset number of points and a line of the first preset number of points, a corresponding relationship between the second preset number of points and a spatial plane of the second preset number of points, and a position and an attitude of the one newly added frame point cloud image; and
  performing an optimization on position and attitude for the one newly added frame point cloud image with the cost function, wherein the first corner point is any corner point in the one newly added frame point cloud image, the first planar point is any planar point in the one newly added frame point cloud image, and both n and j are positive integers.

In some embodiments, performing a global consistency optimization on a global map according to the local fusion map to obtain a dense point cloud map and output a current position information and a current attitude information in real time so as to complete the simultaneous localization and mapping (SLAM) may comprise:
  acquiring an adjacent frame image corresponding to a first frame of fusion image in the local fusion map with a laser loop closure detection;
  acquiring a relative position and attitude between the first frame fusion image and the adjacent frame image; and
  performing a global consistency optimization on a global map according to each frame fusion image in the local fusion map, an adjacent frame image corresponding to each frame fusion image, and a relative position between the each frame fusion image and the adjacent frame image, to obtain a dense point cloud map and output a current position information and a current attitude information in real time so as to complete the simultaneous localization and mapping (SLAM), wherein the first frame fusion image is any frame fusion image in the local fusion map.

One skilled in the art can further realize that the units and algorithm steps of each example described in the present disclosure can be carried out by an electronic hardware, a computer software or a combination thereof. In order to clearly illustrate the interchangeability of the hardware and the software, the components and steps of each example have been generally described in accordance with functions in the above description. Whether these functions are realized by hardware or software depends on the specific application and design constraints of the technical solution. One skilled in the art can use different methods to realize the described functions for each specific application. However, such realization must not be considered beyond the scope of the present disclosure.

The steps of the method or algorithm described in the examples disclosed herein can be carried out with hardware, software modules executed by a processor, or a combination thereof. The software module can be arranged in a RAM (Random Access Memory), a memory, a ROM (Read Only Memory), an electrically programmable ROM, an electrically erasable programmable ROM, a register, a hard disk, a removable disk, a CD-ROM, or any other forms of storage medium known in the art.

The above specific embodiments further explain the objective, technical solution and beneficial effect of the present disclosure. It should be understood that only specific embodiments of the present disclosure are described in the above, and will not limit the protection scope of the present disclosure. Any modification, equivalent replacement, improvement, and the like made within the spirit and principle of the present disclosure shall be comprised in the protection scope of the present disclosure.

What is claimed is:
1. A method for simultaneous localization and mapping (SLAM), comprising:
  acquiring a local binocular vision image and a local three-dimensional laser point cloud image that can be collected at present;

preprocessing the local binocular vision image and the local three-dimensional laser point cloud image, respectively;

acquiring a position and an attitude of a local binocular vision map according to the preprocessed local binocular vision image;

fusing the position and the attitude of the local binocular vision map with the preprocessed local three-dimensional laser point cloud image to obtain a local fusion map; and performing a global consistency optimization on a global map according to the local fusion map to obtain a dense point cloud map and output a current position information and a current attitude information in real time so as to complete the simultaneous localization and mapping (SLAM), wherein the global map is constructed according to a global three-dimensional laser point cloud image;

wherein the preprocessing the local binocular vision image comprises:

extracting features of the local binocular vision image to obtain feature points of the local binocular vision image;

selecting a specific feature point meeting a preset condition from the feature points of the local binocular vision image;

calculating a feature descriptor of the specific feature point; and performing a feature matching for the binocular visual image according to the feature descriptor, so as to construct a local map according to the local binocular visual image obtained after the feature matching; and wherein the acquiring a position and an attitude of a local binocular vision map according to the preprocessed local binocular vision image comprises:

performing local map tracking according to the preprocessed local binocular vision image; and optimizing a currently obtained local map during map tracking to obtain the position and the attitude of the local binocular vision map.

2. The method of claim 1, wherein the preprocessing the local three-dimensional laser point cloud image comprises:

extracting ground points and non-ground points from the three-dimensional laser point cloud image;

distinguishing corner points and planar points in the ground points, and distinguishing corner points and planar points in the non-ground points according to a preset method; and combining the corner points in the ground points and the corner points in the non-ground points together to form a corner point set, and combining the planar points in the ground points and the planar points in the non-ground points together to form a planar point set.

3. The method of claim 2, wherein the fusing the position and the attitude of the local binocular vision map with the preprocessed local three-dimensional laser point cloud image to obtain a local fusion map comprises:

determining a position and an attitude corresponding to each frame point cloud image in the preprocessed local three-dimensional laser point cloud image with a time interpolation method according to the position and the attitude of the local binocular vision map and the preprocessed local three-dimensional laser point cloud image;

extracting a point cloud image with a preset frame number from the preprocessed local three-dimensional laser point cloud image to construct a local point cloud map;

determining a first frame point cloud image in the local point cloud map as a key frame point cloud image;

performing an optimization on position and attitude for a newly added point cloud image;

determining a position difference and/or an attitude difference between a point cloud image with an optimized position and attitude and the key frame point cloud image;

adding the point cloud image with an optimized position and attitude to the local point cloud map after the point cloud image with an optimized position and attitude is determined as a key frame according to the position difference and/or the attitude difference between the point cloud image with an optimized position and attitude and the key frame point cloud image; and constructing a local fusion map after all key frames are obtained from all point cloud images where the point cloud image with an optimized position and attitude is determined as a current key frame.

4. The method of claim 3, wherein the performing an optimization on position and attitude for a newly added point cloud image comprises:

searching for n adjacent corner points corresponding to each corner point in one newly added frame point cloud image, respectively, from a corner point set corresponding to the local point cloud map, and searching for j adjacent planar points corresponding to each planar point in one newly added frame point cloud image, respectively, from a planar point set corresponding to the local point cloud map;

calculating eigenvalues of the n adjacent corner points corresponding to a first corner point, and eigenvalues of the j adjacent planar points corresponding to a first planar point, respectively;

extracting a first preset number of points in a linear line defined by the n adjacent corner points where the adjacent points corresponding to the first corner point are determined to appear linear features according to the eigenvalues corresponding to the n adjacent corner points, respectively;

extracting a second preset number of points in a spatial plane defined by the j adjacent planar points where the adjacent points corresponding to the first planar point are determined to appear planar features according to the eigenvalues corresponding to the j adjacent planar points, respectively;

constructing a cost function according to a corresponding relationship between the first preset number of points and a line of the first preset number of points, a corresponding relationship between the second preset number of points and a spatial plane of the second preset number of points, and a position and an attitude of the one newly added frame point cloud image; and performing an optimization on position and attitude for the one newly added frame point cloud image with the cost function, wherein the first corner point is any corner point in the one newly added frame point cloud image, the first planar point is any planar point in the one newly added frame point cloud image, and both n and j are positive integers.

5. The method of claim 1, wherein the performing local map tracking according to the preprocessed local binocular vision image comprises:

inserting a first frame image of the preprocessed local binocular vision image into a local map as a key frame;

matching feature points between the first frame image as a reference frame and a newly added current frame image;

calculating a position difference and/or a rotation angle difference between the first frame image and the current frame image according to matched feature points between the first frame image and the current frame image;

inserting the current frame image into the local map where the current frame image is determined as a key frame according to the position difference and/or the rotation angle difference; and repeating above operations for a next newly added frame image until all frame images in the local binocular vision image are processed to complete the local map tracking.

6. The method of claim 5, wherein determining the current frame image as a key frame according to the position difference and/or the rotation angle difference comprises:

determining the current frame image as a key frame where a position difference between the first frame image and the current frame image is calculated, and the position difference is greater than or equal to a first preset threshold;

or determining the current frame image as a key frame where a rotation angle difference between the first frame image and the current frame image is calculated, and the rotation angle difference is greater than or equal to a second preset threshold;

or determining the current frame image as a key frame where a position difference and a rotation angle difference between the first frame image and the current frame image are calculated, and both the position difference and the rotation angle difference are greater than or equal to the corresponding preset thresholds.

7. The method of claim 5, wherein the optimizing the currently obtained local map during map tracking to obtain the position and the attitude of the local binocular vision map comprises:

selecting other key frames satisfying a common view relationship with a new key frame from the currently obtained local map after the new key frame is determined to be inserted into the local map;

performing a least squares estimation for residuals between all key frames satisfying the common view relationship with local bundle adjustment; and acquiring the position and the attitude of the local binocular vision map where the residuals are determined to fall into a preset space range.

8. The method of claim 1, wherein the performing a global consistency optimization on a global map according to the local fusion map to obtain a dense point cloud map and output a current position information and a current attitude information in real time so as to complete the simultaneous localization and mapping (SLAM) comprises:

acquiring an adjacent frame image corresponding to a first frame fusion image in the local fusion map with a laser loop closure detection;

acquiring a relative position and attitude between the first frame fusion image and the adjacent frame image; and performing a global consistency optimization on a global map according to each frame fusion image in the local fusion map, an adjacent frame image corresponding to each frame fusion image, and a relative position between the each frame fusion image and the adjacent frame image, to obtain a dense point cloud map and output a current position information and a current attitude information in real time so as to complete the simultaneous localization and mapping (SLAM), wherein the first frame fusion image is any frame fusion image in the local fusion map.

9. A system for simultaneous localization and mapping (SLAM), comprising at least one processor and a memory;

wherein the processor is adapted to carry out a simultaneous localization and mapping (SLAM) program stored in the memory to perform the method for simultaneous localization and mapping (SLAM) of claim 1.

10. A computer storage medium, wherein one or more programs are stored on the computer storage medium, the one or more programs can be carried out to perform the method for simultaneous localization and mapping (SLAM) of claim 1.

11. A device for simultaneous localization and mapping (SLAM), comprising:

an acquisition unit adapted to acquire a local binocular vision image and a local three-dimensional laser point cloud image that can be collected at present, and acquire a position and an attitude of a local binocular vision map according to the preprocessed local binocular vision image;

a processing unit adapted to preprocess the local binocular vision image and the local three-dimensional laser point cloud image, respectively;

a fusion unit adapted to fuse the position and attitude of the local binocular vision map with the preprocessed local three-dimensional laser point cloud image to obtain a local fusion map; and a map optimization unit adapted to perform a global consistency optimization on a global map according to the local fusion map to obtain a dense point cloud map and output a current position information and a current attitude information in real time so as to complete the simultaneous localization and mapping (SLAM), wherein the global map is constructed according to the global three-dimensional laser point cloud image;

wherein the processing unit is adapted to extract features of the local binocular vision image to obtain feature points of the local binocular vision image;

select a specific feature point meeting a preset condition from the feature points of the local binocular vision image;

calculate a feature descriptor of the specific feature point; and perform a feature matching for the binocular visual image according to the feature descriptor, so as to construct a local map according to the local binocular visual image obtained after the feature matching; and wherein the processing unit performs local map tracking according to the preprocessed local binocular vision image; and optimizes a currently obtained local map during map tracking to obtain the position and an attitude of the local binocular vision map.

* * * * *